United States Patent Office 3,017,861
Patented Jan. 23, 1962

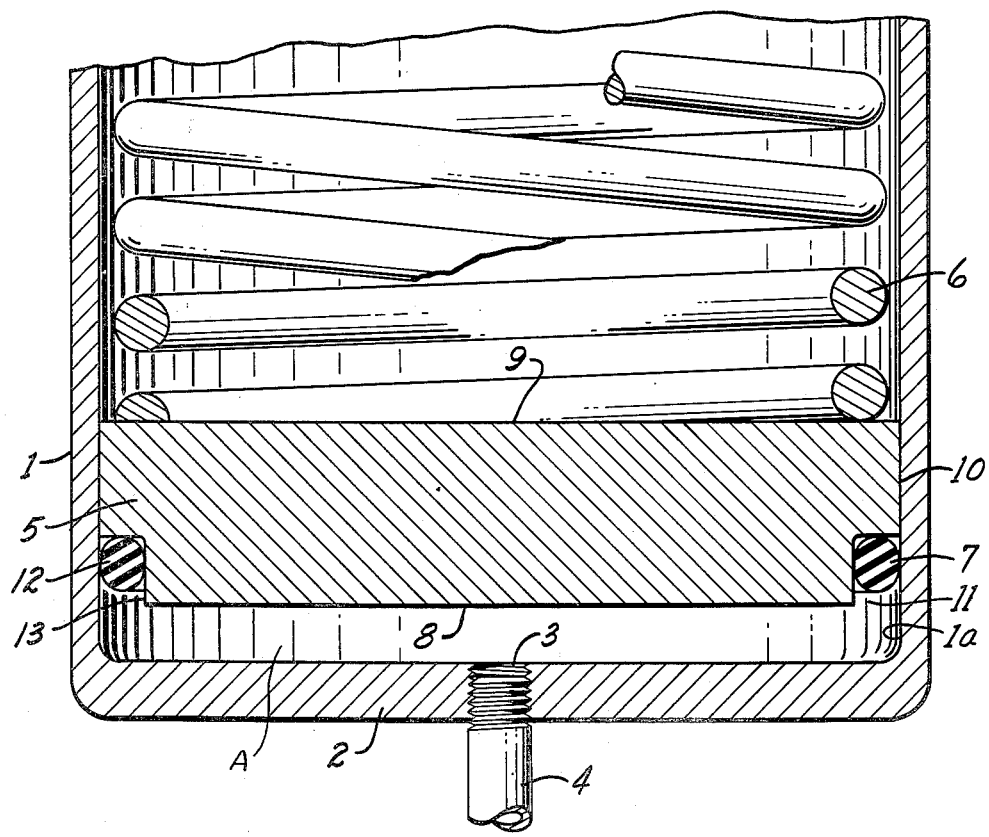

3,017,861
PISTON CONSTRUCTION
Harold L. Dobrikin, Chicago, Ill., assignor to Berg Airlectro Products Company, Chicago, Ill., a corporation of Illinois
Filed June 29, 1959, Ser. No. 823,512
1 Claim. (Cl. 121—38)

This invention relates to pistons and has particular relation to the construction thereof.

One purpose is to provide a piston having a particular means for retaining a seal mechanism therefor.

Another purpose is to provide an improved method of forming a piston.

Another purpose is to provide a piston of maximum simplicity in construction and manufacture.

Another purpose is to provide a piston of maximum economy in manufacture.

Another purpose is to provide a piston of improved leakage-resistant properties.

Another purpose is to provide a piston having seal retaining means of maximum simplicity.

A widely employed method of forming pistons involves the casting, as by die casting, of the piston from molten metal. The piston employed in air or hydraulic cylinders requires the employment therewith of seal means, a common and widely used seal means comprising what is known as an O ring normally formed of flexible material having the properties of rubber, for example. In die casting it is difficult if not impossible to form a groove in the circumferential outer surface of the piston to receive and retain the O ring or seal means. Accordingly, the universal practice is to die cast the piston with an uninterrupted outer circumferential wall and thereafter to machine the seal-retaining groove therein. In addition to the cost involved in machining said groove, such machining removes a portion of the outer smooth skin formed on the piston in the die casting operation. At times this removal of the outer skin uncovers the porosity developed in the metal of the piston in the die casting operation. The resulting porosity permits leakage of air through the piston and weakens or destroys the efficient operation thereof. Where the piston is used with oil or similar fluids, a similar leakage though at a slower rate is caused by exposure of the porous metal resulting from the machining operation. It is accordingly a purpose of this invention to eliminate this requirement for machining such pistons.

Other purposes will appear from time to time during the course of the specification and claim.

I illustrate the invention more or less diagrammatically in the accompanying drawing wherein:

The FIGURE is a side elevation in cross section.

Referring now to the drawing herein, the numeral 1 generally indicates an end portion of a cylinder. The cylinder 1 has an end wall 2 in which an air passage 3 is formed. I illustrate, for convenience, a portion of a fitting 4 secured in the passage 3.

A piston illustrative of the invention is indicated by the numeral 5. A spring, 6, as is well known, may be positioned within the cylinder 1 on the opposite side of the piston from that opposed to passage 3. A seal, which may take the form of the O ring 7, is associated with the piston 5 for the purpose of sealing the air entering into chamber A formed within the chamber 1 between the chamber wall 2 and the face 8 of piston 5.

Referring particularly to the piston illustrated at 5, it will be observed that the piston has a flat rear wall 9 and a circumferential wall 10. The wall 10 is recessed, as at 11, creating an annular wall surface 12 bounded inwardly by a circumferential wall surface 13, the diameter of which is less than that of the wall 10. The wall surface 13 terminates at the edge of piston pressure-receiving or face surface 8. It will further be observed that annular wall surface 12 is of a width such as to sealingly receive the seal 7, the distance between the inner wall 1a of cylinder 1 and the surface 13 being designed to receive the seal 7 and to retain the seal 7 in sealing engagement against the wall surface 1a of cylinder 1.

While I have shown and described a preferred form and suggested several variations of my inventions, as well as illustrating a species, numerous additional modifications, changes, substitutions and alternations may be made without departing from the invention's fundamental theme. With these and various other modifications in mind, I wish that the invention be unrestricted, except as by the appended claim.

The use and operation of my invention are as follows:

The piston 5 is of such construction as to be formed by die casting without difficulty, there being no groove required for retention of the seal 7. All necessity for machining such groove is eliminated in the piston constructed in accordance with the invention. While the rear surface 9 is shown as unbroken, it will be realized that the rear surface of a piston formed in accordance with the invention may take a variety of forms without departing from the nature and scope of the invention.

As air, or other fluid enters the chamber A under pressure the piston 5 is caused to move in a direction away from the wall 2 or to the right as the parts are shown in the drawing. The air or other fluid pressure in chamber A, I have discovered, is effective to retain the seal 7 against the surface 12 within the recess 11 and in continuous sealing engagement with wall 1a and to move the seal 7 with the piston under the influence of the pressure in chamber A. When the pressure in chamber A is diminished and piston 5 is moved toward wall 2, under the influence of the spring 6, the wall surface 12 is effective to move the seal 7 with the piston. Since the piston of my invention may be employed as it comes from the die casting operation, no possibility of destroying the skin surface formed thereby is created. By forming the annular recess or off-set at the fluid pressure-receiving end of the piston of my invention, a seal is retained in sealing engagement with the cylinder in which the piston is movably mounted and in engagement with the piston by a combination of the annular recess wall at one side of the seal and the fluid pressure itself at the opposite side of the seal.

I claim:

In a cylinder and piston assembly, a cylinder, means for admitting fluid under pressure to said cylinder, a piston having a fluid pressure-receiving surface opposed to said fluid pressure admitting means, said surface having a diameter substantially less than the inner diameter of said cylinder, said piston having a diameter substantially equal to the inner diameter of said cylinder, said piston having a circumferential wall surface in sliding contact with the inner wall of said cylinder, said piston having a second circumferential wall surface extending axially from said pressure-receiving surface to the remaining portion of said piston, said piston having an annular surface joining said circumferential wall surfaces, a flexible seal ring surrounding said pressure-receiving surface and having one side exposed to said fluid under pressure, the normal cross-sectional diameter of said seal ring being greater than the width of said annular piston surface whereby the normal cross-sectional configuration of said seal ring is deformed when said seal ring is positioned between said second circumferential piston wall surface and the inner wall of said cylinder, said second annular piston wall surface being of an axial extension greater than the normal cross-sectional diameter of said seal ring.

References Cited in the file of this patent
UNITED STATES PATENTS

| | | |
|---|---|---|
| 2,124,360 | Welty | July 19, 1938 |
| 2,174,644 | Weatherhead et al. | Oct. 3, 1939 |
| 2,244,954 | Lenz et al. | June 10, 1941 |
| 2,494,598 | Waring | Jan. 17, 1950 |
| 2,705,177 | Waring | Mar. 29, 1955 |
| 2,825,590 | Sotherland | Apr. 4, 1958 |
| 2,893,795 | Dooling | July 7, 1959 |